J. R. COE.
GAGE AND MEASURING INSTRUMENT.
APPLICATION FILED MAR. 18, 1908.
930,330.
Patented Aug. 3, 1909.
2 SHEETS—SHEET 2.
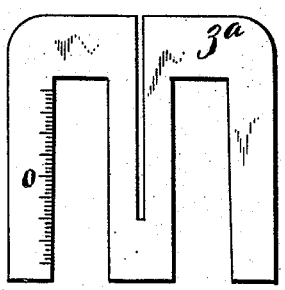
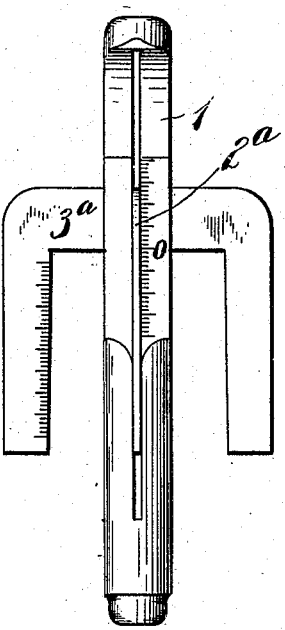
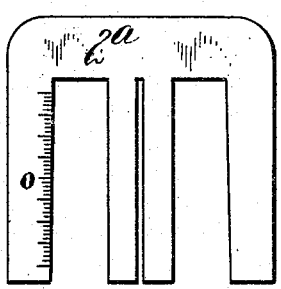
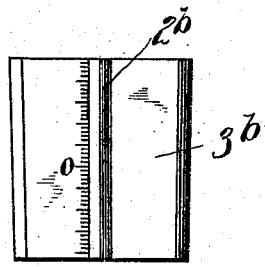
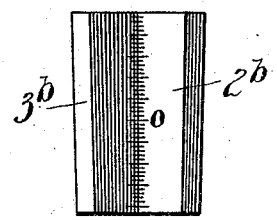
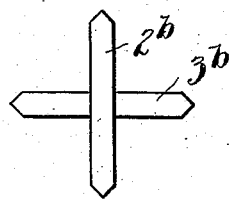
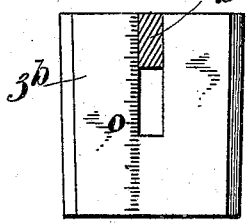
Witnesses:
Inventor
J. R. Coe
By his Attorneys

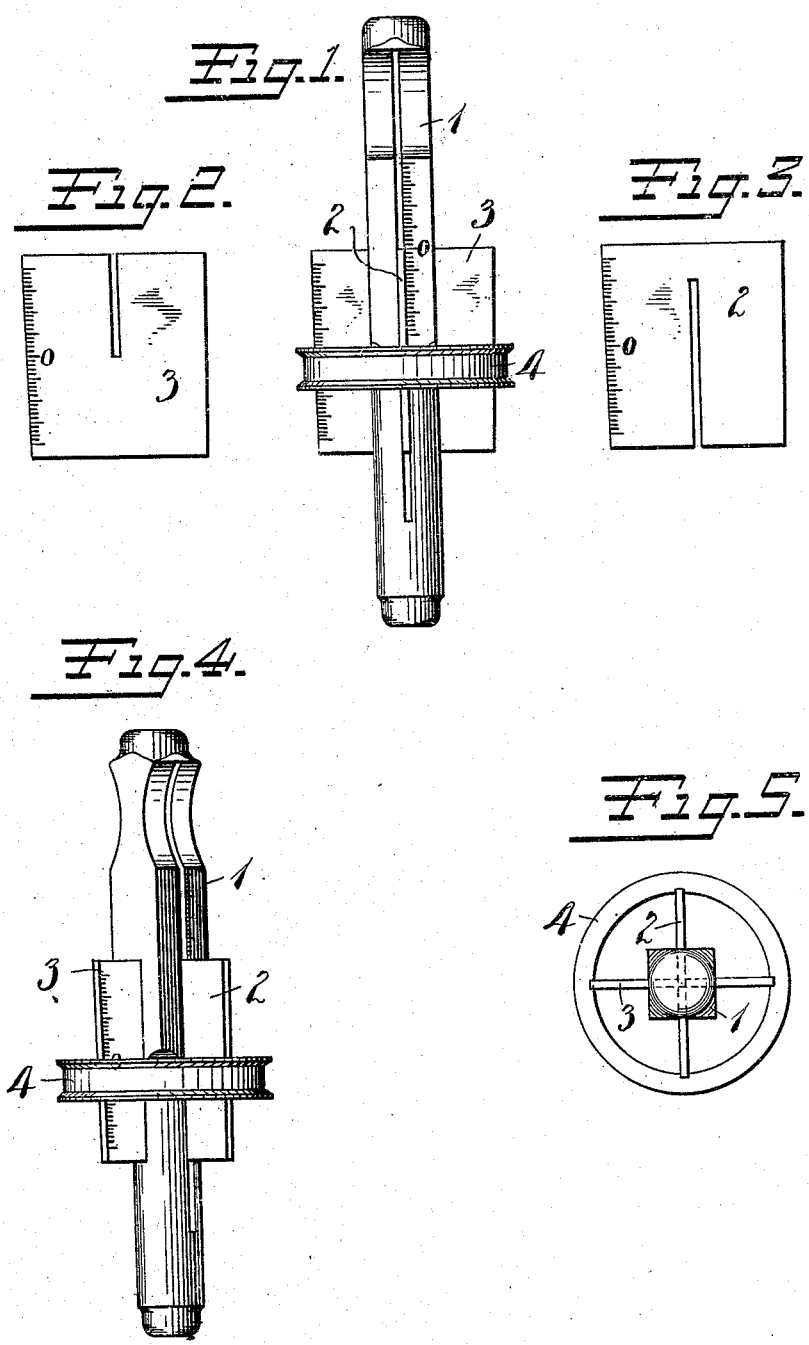

UNITED STATES PATENT OFFICE.

JAMES R. COE, OF WATERBURY, CONNECTICUT, ASSIGNOR OF ONE-HALF TO ADELBERT P. HINE, OF WATERBURY, CONNECTICUT.

GAGE AND MEASURING INSTRUMENT.

No. 930,330.      Specification of Letters Patent.      Patented Aug. 3, 1909.

Application filed March 18, 1908. Serial No. 421,858.

*To all whom it may concern:*

Be it known that I, JAMES R. COE, a citizen of the United States, residing at Waterbury, New Haven county, State of Connecticut, have invented certain new and useful Improvements in Gages and Measuring Instruments, of which the following is a full, clear, and exact description.

My invention relates to improvements in gages and measuring instruments, the main object of the invention being to provide a simple and effective device whereby the accuracy of bodies intended to be round may be quickly tested. The invention will also be found of great utility wherein it is employed as a measuring gage for the purpose of ascertaining the degree of variation from the round. For example, as one illustration, spinning rings are devices which, because of their use, must be made as near round as possible both externally and internally. To test such a device with any instrument now known is an exceedingly difficult and laborious process. By the use of my invention such devices may be quickly gaged and any error or imperfection quickly discovered, as well as the degree thereof.

In the drawings, Figure 1 is a side elevation of my invention as in use; Figs. 2 and 3 are elevations of the gage-plates detached; Fig. 4 is a side elevation of the parts as shown in Fig. 1, but taken at an angle of 45 degrees; Fig. 5 is a plan view of Fig. 1; Fig. 6 is an elevation of a modification; Figs. 7 and 8 are views of gage-plates of the modified form adapted to Fig. 6; Fig. 9 is a view of another modification, the carrier being eliminated; Fig. 10 is a plan view thereof; Fig. 11 is a view similar to Fig. 9 but taken at an angle of 45 degrees relatively thereto; Fig. 12 is a side elevation of one of the plates shown in Fig. 9, its companion plate being shown in section.

In Figs. 1 to 5, 1 is the holder. 2—3 are gage plates carried thereby. In the form shown, the main body 1 is provided with two longitudinally disposed slots, which are arranged preferably in planes at right angles to each other. One of these slots, as shown, is longer than the other. The two gage plates are arranged to stand in these slots in the body at right angles to each other, one of said plates being permitted to slide longitudinally relatively to the other. Each of these plates is slotted partially through and is given a taper. While any desired taper may be employed, a slight taper is preferred for the most accurate work, for example, a taper 1-1000 of an inch to 1-32 of an inch in length, these fractions of an inch being taken for convenience in reading.

When the device is used as a gage, without regard to measurements, no graduations are necessary, but since it may be at once used as a gage and a measuring device, it is preferred to provide graduations wherever they may be employed to enlighten the user as to the exact measurements and variations of measurements. In use as a gage merely, assuming the instrument is inserted into a ring which is in the form of an exact circle, it will be apparent that the inner wall of the ring will engage both edges of each plate at precisely the same elevation, with the result that the movable plate 2 will be lifted to a point where its upper edge registers precisely with the upper edge of the relatively stationary plate 3. If any variation should exist, it would be indicated by a difference in the elevation of said upper edges. For example, if the ring were of a greater diameter where it engages the movable plate 3, it would not engage the same so as to lift it to a point where its upper edge would be level with the upper edge of the stationary plate 2. On the other hand, if the ring were of less diameter at the point where it engages the movable plate, it would lift it to a point where its upper edge would be above the upper edge of the stationary plate, thereby at once indicating in either event a variation in the ring one way or the other. By this simple gage mechanism, imperfect rings may be quickly detected and discarded. It is, of course, apparent that both plates might have a longitudinal sliding movement, but when the device is used as a measuring instrument it is, of course, preferred to start from a fixed zero, and to that end, in the preferred form, I make one of said plates stationary, so far as any longitudinal movement relatively to the carrier 1 is concerned.

The external measurements of a ring may be quickly ascertained by having the plates 2ª 3ª formed as shown in Figs. 6 to 8, and arranged to embrace the outer edges rather than the inner edges, the same method being applied as above outlined. As a check on the gage to ascertain its accuracy, a very simple method may be followed, to wit, first place the gage within or on the ring in one position after another and observe whether the upper edge of the movable plate registers with the upper edge of the stationary plate in all positions. If it is found that the upper edge of the movable plate, when placed in the ring in one position, stands a certain distance below the upper edge of the fixed plate, if the gage is then withdrawn and turned exactly 90° and then re-inserted into the ring, the upper edge of the said movable plate should project above the upper edge of the stationary plate the same distance that it formerly stood below the upper edge of said fixed plate, thereby checking the accuracy of the gage beyond all question. By this gage the accuracy of the ring may be determined at any and every point, both externally and internally, depending merely upon the shape of the gage plates, whether adapted to the former or the latter. By my invention it will be apparent that this gage is well adapted to detect any local inaccuracy which would render the ring or tested device unfit.

When the gage is to be used as a measuring instrument, a series of graduations are provided on the holder 1 along the edge of a long slot, the zero mark thereon being in the same plane as the upper edge of the stationary plate (see Fig. 1). Let us assume that these graduations are on the scale of 1-32 of an inch. Let us also assume that the taper of each plate is 1-1000 of an inch to each 1-32 of an inch in length. From the foregoing, it follows that if the movable plate when inserted into a ring projects above or below the zero mark 1-32 of an inch, it indicates instantly that the ring is out of true 1-1000 of an inch, and so on, the greater diameter being determined by the position of the movable plate, whether above or below the zero mark. To illustrate, if the movable plate stood across the greatest diameter of the ring, its upper edge would be below the zero mark. By graduating the outer edges of one or both of the gage plates, the exact internal diameter of the ring may be determined at corresponding points. In Fig. 1 it may be assumed that if the ring 4 registered with the middle of the plate (as shown), the internal diameter of the ring would be shown as 1 and 3-8 inches in diameter, for example. The graduations extending below and above the middle position, indicating fractions of an inch, for example, 1-1000 of an inch, this being the assumed unit in this instance and in the example mentioned. The graduations above and below the median line will tell, when the plate is introduced, precisely the diameter of the ring in 1-1000ths of an inch, varying from 1 and 3-8 of an inch, or whatever unit of width is employed. A series of different sized coacting gage plates may be used to be substituted in the carrier 1, as desired.

The length of the gage plate is immaterial, save for convenience, since one set of plates might be made of such length as to give a very wide range of measurement.

While it is preferable that a carrier 1 be employed to guide, aline and steady the gage plates, also to facilitate handling the same, it is obvious, however, that an effective gage of this type could be made which eliminates the carrier *per se*, simply providing means for slidably connecting the plates 2ᵇ 3ᵇ, as shown in Figs. 9 to 12. In such a modification, for the sake of providing a suitable bearing, the plates might be made considerably thicker than in the other views, their outer edges being thinned down to facilitate proper contact with the device to be tested. Graduations may likewise be provided on these plates.

What I claim is:

1. In a device of the character described, two coacting gage plates crossing each other, each of said plates being correspondingly tapered, one of said plates being movable relatively to the other in the line of the axis established by the crossing point.

2. In a device of the character described, a carrier, two coacting tapered gage plates carried thereby and crossing each other at an angle, one of said plates being movable longitudinally relatively to the other.

3. In a device of the character described, two coacting gage plates crossing each other, each of said plates being correspondingly tapered, one of said plates being movable relatively to the other in the line of the axis established by the crossing point, each of said plates being of the same width at a given point from which the gage is read.

4. In a device of the character described, two coacting gage plates crossing each other, each of said plates being correspondingly tapered, one of said plates being movable relatively to the other in the line of the axis established by the crossing point, each of the plates being of the same width at one end.

5. In a device of the character described, a carrier having two slots crossing each other axially relatively to the carrier, one of said slots being longer than the other, two tapered plates having a corresponding taper, one plate being arranged to stand in one of said slots, the other in the other of said slots, said plates intersecting each other along center lines, the plate in the longer slot being capable of longitudinal movement relatively to the axis of intersection.

6. In a device of the character described, a pair of plates having correspondingly tapered gage edges, said plates intersecting each other on an axis median to each of said gage edges, one of said plates being movable relatively to the other along the line of said axis of intersection, and a registering point on each of said plates arranged to indicate corresponding transverse dimensions on both plates.

7. In a device of the character described, a carrier, two correspondingly tapered plates carried thereby and intersecting each other at a median line establishing an axis, one of said plates being movable on said carrier relatively to said axis, and graduations on one of said plates.

8. In a device of the character described, a carrier, two correspondingly tapered plates carried thereby and intersecting each other at a median line establishing an axis, one of said plates being movable on said carrier relatively to said axis, and graduations on the carrier.

JAMES R. COE.

Witnesses:
   DAVID H. COE,
   INA M. ALLEN.